(12) United States Patent
Konishi et al.

(10) Patent No.: US 12,512,645 B2
(45) Date of Patent: Dec. 30, 2025

(54) SEMICONDUCTOR OPTICAL DEVICE AND METHOD OF MANUFACTURING THE SAME

(71) Applicant: Sumitomo Electric Industries, Ltd., Osaka (JP)

(72) Inventors: Naoko Konishi, Osaka (JP); Takehiko Kikuchi, Osaka (JP); Hideki Yagi, Osaka (JP); Nobuhiko Nishiyama, Tokyo (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 764 days.

(21) Appl. No.: 17/897,647

(22) Filed: Aug. 29, 2022

(65) Prior Publication Data
US 2023/0060877 A1 Mar. 2, 2023

(30) Foreign Application Priority Data

Aug. 30, 2021 (JP) .................................. 2021-139670

(51) Int. Cl.
*H01S 3/04* (2006.01)
*H01S 5/02* (2006.01)
(Continued)

(52) U.S. Cl.
CPC .......... *H01S 5/1032* (2013.01); *H01S 5/0207* (2013.01); *H01S 5/021* (2013.01);
(Continued)

(58) Field of Classification Search
CPC ...... H01S 5/1032; H01S 5/0207; H01S 5/021; H01S 5/0215; H01S 5/02461;
(Continued)

(56) References Cited

U.S. PATENT DOCUMENTS

| 2003/0169796 A1 | 9/2003 | Nakamura et al. |
| 2017/0098922 A1 | 4/2017 | Hatori et al. |
| 2017/0123172 A1 | 5/2017 | Adachi et al. |

FOREIGN PATENT DOCUMENTS

| JP | 2003-264334 A | 9/2003 |
| JP | 2008-135629 A | 6/2008 |

(Continued)

OTHER PUBLICATIONS

Matthew N. Sysak et al., "Reduction of hybrid silicon laser thermal impedance using Poly Si thermal shunts", Optical Fiber Communication Conference 2011, paper OWZ6, Los Angeles, California United States, pp. 296-298, Mar. 6-10, 2011.

(Continued)

*Primary Examiner* — Kinam Park
(74) *Attorney, Agent, or Firm* — Volpe Koenig

(57) ABSTRACT

A semiconductor optical device includes a substrate having an optical waveguide, a gain section formed of a compound semiconductor having an optical gain and bonded to an upper surface of the substrate, the gain section having a first mesa, and a first wiring line electrically connected to the gain section. The first mesa of the gain section is optically coupled to the optical waveguide. The substrate includes a first layer, a second layer, and a third layer. The first layer has a higher thermal conductivity than the second layer. The second layer is stacked on the first layer. The third layer is stacked on the second layer. A recess provided in the substrate extends through the third layer to the second layer in the thickness direction. The first wiring line extends from the first mesa of the gain section to the recess.

9 Claims, 17 Drawing Sheets

(51) Int. Cl.
    *H01S 5/024*   (2006.01)
    *H01S 5/042*   (2006.01)
    *H01S 5/10*    (2021.01)
    *H01S 5/22*    (2006.01)
    *H01S 5/343*   (2006.01)

(52) U.S. Cl.
    CPC ........ *H01S 5/0215* (2013.01); *H01S 5/02461* (2013.01); *H01S 5/02476* (2013.01); *H01S 5/04254* (2019.08); *H01S 5/22* (2013.01); *H01S 5/02469* (2013.01); *H01S 5/3434* (2013.01); *H01S 5/34373* (2013.01); *H01S 2301/176* (2013.01)

(58) Field of Classification Search
    CPC .... H01S 5/02476; H01S 5/04254; H01S 5/22; H01S 5/02469; H01S 5/3434; H01S 5/34373; H01S 2301/176
    See application file for complete search history.

(56) References Cited

FOREIGN PATENT DOCUMENTS

| | | | |
|---|---|---|---|
| JP | 2017-069494 A | 4/2017 | |
| JP | 2017-085007 A | 5/2017 | |

OTHER PUBLICATIONS

T. Kikuchi et al., "III-V/Si direct bonding technology for next generation photonic integrated circuits", .Proceedings of the Institute of Electronics, Information and Communication Engineers Society Conference, Sep. 1, 2020.

SEMICONDUCTOR OPTICAL DEVICE AND METHOD OF MANUFACTURING THE SAME

CROSS REFERENCE TO RELATED APPLICATIONS

This application claims priority based on Japanese Patent Application No. 2021-139670 filed on Aug. 30, 2021, and the entire contents of the Japanese patent application are incorporated herein by reference.

TECHNICAL FIELD

The present disclosure relates to semiconductor optical devices and methods of manufacturing the same.

BACKGROUND

There has been known a technique of bonding a semiconductor device formed of a III-V compound semiconductor to a substrate such as an SOI (Silicon On Insulator) substrate (so-called silicon photonics) in which a waveguide is formed (see NON-PATENT DOCUMENT 1: Matthew N. Sysak, H. Park, A. W. Fang, Omri Raday, John E Bowers, Richard Jones, "Reduction of hybrid silicon laser thermal impedance using Poly Si thermal shunts", Optical Fiber Communication Conference 2011, paper OWZ6, Los Angeles, California United States, 6-10 Mar. 2011).

SUMMARY

A semiconductor optical device according to the present disclosure includes a substrate including an optical waveguide, a gain section formed of a III-V compound semiconductor, having an optical gain, bonded to an upper surface of the substrate, and including a first mesa, and a first wiring line electrically connected to the gain section. The first mesa of the gain section is optically coupled to the optical waveguide, the substrate includes a first layer, a second layer, and a third layer, a thermal conductivity of the first layer is higher than a thermal conductivity of the second layer, the second layer is stacked on the first layer, the third layer is stacked on the second layer and includes the optical waveguide, a recess is provided in the substrate at a position spaced from the first mesa, the recess being sunk from the upper surface of the substrate in a thickness direction of the substrate, the recess extends through the third layer to the second layer in the thickness direction, and the first wiring line extends from the first mesa of the gain section to the recess.

A method of manufacturing a semiconductor optical device according to the present disclosure includes bonding a gain section formed of a III-V compound semiconductor and having an optical gain to an upper surface of a substrate including an optical waveguide, forming a first mesa on a part of the gain section above the optical waveguide, forming a recess in the substrate at a position spaced from the first mesa, the recess being sunk from the upper surface of the substrate in a thickness direction of the substrate; and forming the first wiring line electrically connected to the gain section. the substrate includes a first layer, a second layer, and a third layer, a thermal conductivity of the first layer is higher than a thermal conductivity of the second layer, the second layer is stacked on the first layer, the third layer is stacked on the second layer and includes the optical waveguide, the recess extends through the third layer to the second layer in the thickness direction, and the first wiring line extends from the first mesa of the gain section to an inside of the recess.

DETAILED DESCRIPTION

Figure 1A:
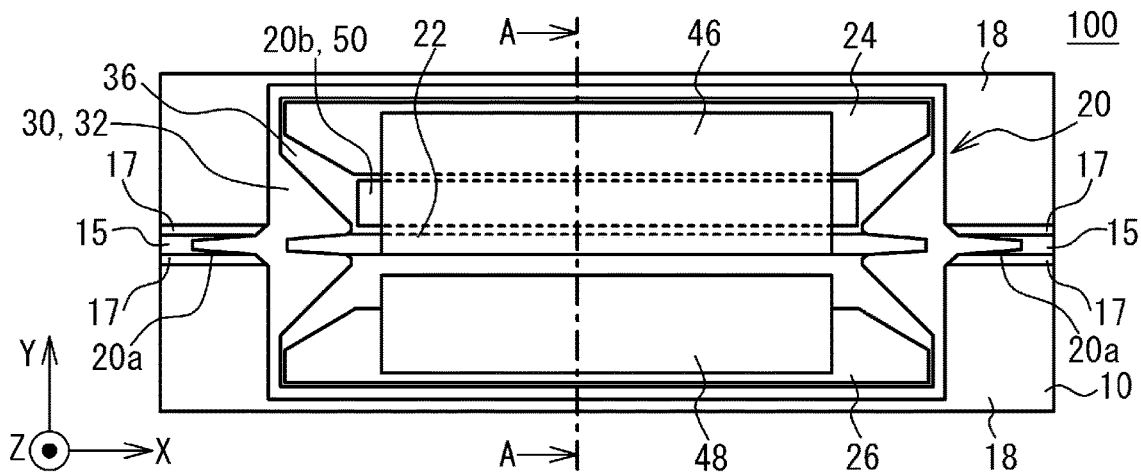
FIG. 1A is a plan view illustrating a semiconductor optical device according to a first embodiment.

When a semiconductor optical device is operated, heat is generated. As the temperature rises, the characteristics may deteriorate. In order to suppress the deterioration of characteristics, it is important to improve heat dissipation and suppress the temperature rise. In the Non-Patent Document 1, heat dissipation is improved by a shunt structure in which polysilicon having high thermal conductivity is provided on a substrate.

A ridge mesa structure is formed to enhance optical confinement. When the polysilicon is separated from the ridge mesa structure, heat generated in the vicinity of the ridge mesa structure is hard to be transmitted, and heat dissipation becomes insufficient. It is therefore an object of the present disclosure to provide a semiconductor optical device capable of improving heat dissipation and a method of manufacturing the same capable of improving heat dissipation.

First, the contents of the embodiments of the present disclosure will be listed and explained.

(1) A semiconductor optical device according to an aspect of the present disclosure includes a substrate including an optical waveguide, a gain section formed of a III-V compound semiconductor, having an optical gain, bonded to an upper surface of the substrate, and including a first mesa, and a first wiring line electrically connected to the gain section. The first mesa of the gain section is optically coupled to the optical waveguide, the substrate includes a first layer, a second layer, and a third layer, a thermal conductivity of the first layer is higher than a thermal conductivity of the second layer, the second layer is stacked on the first layer, the third layer is stacked on the second layer and includes the optical waveguide, a recess is provided in the substrate at a position spaced from the first mesa, the recess being sunk from the upper surface of the substrate in a thickness direction of the substrate, the recess extends through the third layer to the second layer in the thickness direction, and the first wiring line extends from the first mesa of the gain section to the recess. The first wiring line functions as a path of heat. Heat generated in the first mesa is transferred to the first layer of the substrate through the first wiring line, and is dissipated to the outside of the semiconductor optical device. It is possible to enhance heat dissipation.

(2) The first layer and the third layer may be formed of silicon, and the second layer may be formed of silicon oxide. The thermal conductivity of the first layer is higher than the thermal conductivity of the second layer. The heat is transferred from the first wiring line to the first layer of the substrate, and is dissipated to the outside of the semiconductor optical device. It is possible to enhance heat dissipation.

(3) The recess may extend through the third layer and the second layer, the recess may have an insulating film covering a bottom surface of the recess, and the first wiring line may be provided on a surface of the insulating film. Since the recess extends through the second layer, the first wiring line extends to the first layer. Heat is easily transmitted to the first layer, and heat dissipation is improved. Since the first wiring line is provided on the surface of the insulating film, the first wiring line and the first layer are electrically insulated from each other. The leakage current can be suppressed.

(4) The recess may extend through the third layer and the second layer, and the first wiring line may be in contact with the first layer inside the recess. Since the recess extends through the second layer, the first wiring line extends to the first layer. Heat is easily transmitted to the first layer, and heat dissipation is improved.

(5) The recess may extend to a certain point of the second layer in the thickness direction. The second layer in the recess is thinner than the second layer in a portion other than the recess. Heat is easily transmitted to the first layer, and heat dissipation is improved. A leakage current between the first wiring line and the first layer can be suppressed.

(6) An inner wall of the recess may be inclined with respect to the thickness direction. The first wiring line is hard to be disconnected.

(7) The gain section may have an opening at a position overlapping with the recess, and the first wiring line may extend from the first mesa to the opening and the recess. The recess is provided near the first mesa, and the first wiring line extends into the recess. Since there is a heat dissipation path near the first mesa, heat dissipation is improved.

(8) The gain section may include a second mesa, the second mesa may be spaced from the first mesa, the gain section may have an opening at a position overlapping with the recess and between the second mesa and the first mesa, and the first wiring line may extend from the first mesa to the opening and the recess. The recess is provided near the first mesa, and the first wiring line extends into the recess. Since there is a heat dissipation path near the first mesa, heat dissipation is improved.

(9) The gain section may include a first semiconductor layer, an active layer, and a second semiconductor layer stacked in sequence on the upper surface of the substrate, the first mesa includes the second semiconductor layer, the first semiconductor layer may have a first conductivity-type and may extend below and outside the first mesa in a direction in which the upper surface of the substrate extends, the second semiconductor layer may have a second conductivity-type different from the first conductivity-type, the active layer may be located below the first mesa, the first wiring line may be electrically connected to the second semiconductor layer, and the semiconductor optical device may include a second wiring line electrically connected to the first semiconductor layer. Light is generated by injecting carriers into the active layer. Light can be strongly confined in the vicinity of the first mesa. Heat generated in the first mesa may be dissipated to the first layer of the substrate through the first wiring line.

(10) A method of manufacturing a semiconductor optical device includes bonding a gain section formed of a III-V compound semiconductor and having an optical gain to an upper surface of a substrate including an optical waveguide, forming a first mesa on a part of the gain section above the optical waveguide, forming a recess in the substrate at a position spaced from the first mesa, the recess being sunk from the upper surface of the substrate in a thickness direction of the substrate, and forming the first wiring line electrically connected to the gain section. The substrate includes a first layer, a second layer, and a third layer, a thermal conductivity of the first layer is higher than a thermal conductivity of the second layer, the second layer is stacked on the first layer, the third layer is stacked on the second layer and includes the optical waveguide, the recess extends through the third layer to the second layer in the thickness direction, and the first wiring line extends from the first mesa of the gain section to an inside of the recess. The first wiring line functions as a path of heat. Heat generated in the first mesa is transferred to the first layer of the substrate through the first wiring line, and is dissipated to the outside of the semiconductor optical device. It is possible to enhance heat dissipation.

(11) The method may include forming an opening in a part of the gain section spaced from the first mesa. The forming of a recess may include etching a part of the substrate overlapping with the opening. Since there is a heat dissipation path near the first mesa, heat dissipation is improved.

(12) The forming of a recess may include dry etching the substrate and wet etching the substrate after the dry etching. The inner wall of the recess becomes an inclined surface. The first wiring line is hard to be disconnected.

DETAILS OF EMBODIMENTS OF PRESENT DISCLOSURE

Specific examples of the semiconductor optical device and a method of manufacturing the same according to embodiments of the present disclosure will be described below with reference to the drawings. It should be noted that the present disclosure is not limited to these examples, but is defined by the scope of claims, and is intended to include all modifications within the meaning and range equivalent to the scope of claims.

First Embodiment (Semiconductor Optical Device)

Figure 1B:
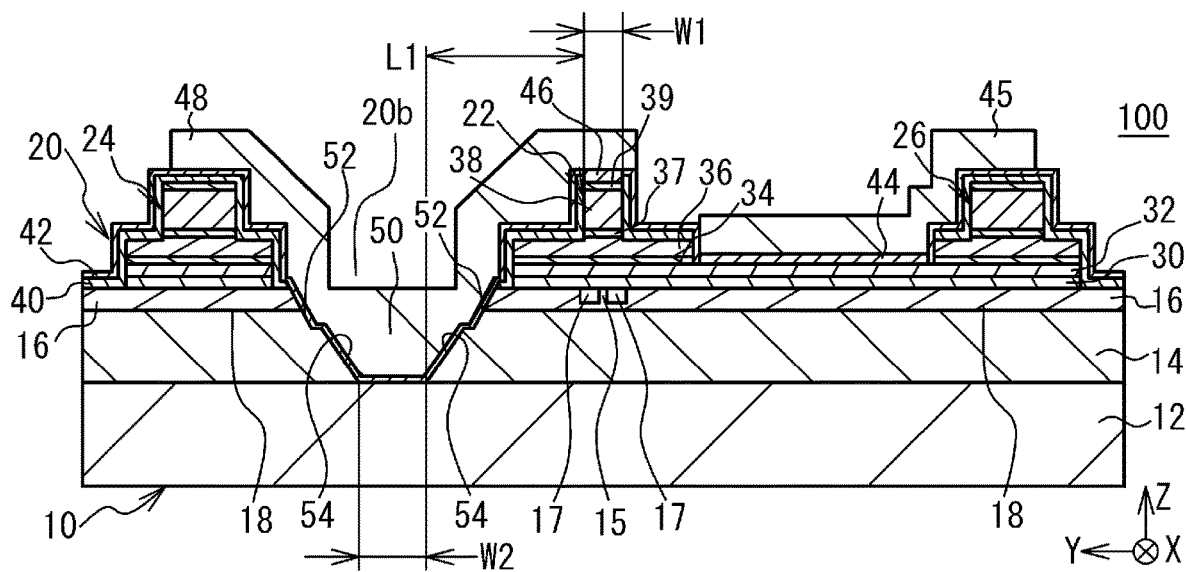
FIG. 1B is a cross-sectional view taken along line A-A of FIG. 1A.

FIG. 1A is a plan view illustrating a semiconductor optical device 100 according to a first embodiment. FIG. 1B is a cross-sectional view taken along line A-A of FIG. 1A. As illustrated in FIGS. 1A and 1B, semiconductor optical device 100 is a hybrid laser device having a substrate 10 and a gain section 20. Substrate 10 has an upper surface parallel to the XY plane. Gain section 20 is bonded to the upper surface of substrate 10.

Two sides of substrate 10 extend in an X-axis direction. The other two sides of substrate 10 extend in a Y-axis direction. The lengths of the sides in the X-axis direction are, for example, 1.5 mm. The lengths of the sides in the Y-axis direction are, for example, 0.6 mm. A Z-axis direction is a normal direction of the XY plane and is a stacking direction of layers. The X-axis direction, the Y-axis direction, and the Z-axis direction are orthogonal to each other. As illustrated in FIG. 1B, insulating films 40 and 42 cover substrate 10 and gain section 20. In FIG. 1A, insulating films 40 and 42 are transmitted.

Substrate 10 is an SOI substrate having a substrate 12 (first layer), a box layer 14 (second layer), and a silicon (Si) layer 16 (third layer). Substrate 12 is formed of Si having a thickness of 500 µm, for example. Box layer 14 is formed of silicon oxide (SiO$_2$) having a thickness of 3 µm, for example, and is stacked on the upper surface of substrate 12. Si layer 16 is formed of silicon having a 200-nm thickness, for example, and is stacked on the upper surface of box 14.

Si layer 16 has an optical waveguide 15, two grooves 17, and two terraces 18. Groove 17 is a cavity sunk from the upper surface of Si layer 16 in a thickness direction (Z-axis direction). The depth of groove 17 is, for example, 150 nm. Groove 17 extends from the upper surface of Si layer 16 to the middle of Si layer 16 in the Z-axis direction. The bottom surface of groove 17 is Si layer 16. Optical waveguide 15 is disposed between two grooves 17. Optical waveguide 15 and groove 17 extend from a first end to a second end of substrate 10 in the X-axis direction. The width of optical waveguide 15 is, for example, 0.5 µm. Terrace 18 is located on the opposite side of groove 17 from optical waveguide 15. Terrace 18 is a plane of Si.

Gain section 20 is a device formed of a III-V compound semiconductor and has a ridge mesa structure. Gain section 20 has an optical gain and functions as a light emitting element. Gain section 20 has mesas 22, 24 and 26 and an opening 20b. Mesa 22 (first mesa) is located at a central portion of gain section 20 in the Y-axis direction. Mesas 24 and 26 (second mesas) are located on both sides of mesa 22 in the Y-axis direction. Opening 20b is located between mesa 24 and mesa 22 in the Y-axis direction.

As illustrated in FIG. 1B, gain section 20 includes a damage mitigation layer 30, a cladding layer 32, optical confinement layers 34 and 37, an active layer 36, a cladding layer 38, and a contact layer 39. Damage mitigation layer 30, cladding layer 32, optical confinement layer 34, and active layer 36 are stacked in this order from the side closer to the upper surface of substrate 10. Damage mitigation layer 30, cladding layer 32, optical confinement layer 34, and active layer 36 are located below mesas 22, 24, and 26, and extends between mesa 22 and mesa 24 and between mesa 22 and mesa 26. Damage mitigation layer 30 and cladding layer 32 are more extensive than active layer 36.

Each of mesas 22, 24 and 26 includes optical confinement layer 37, cladding layer 38 and contact layer 39. Mesa 22 is located above optical waveguide 15 and grooves 17 of substrate 10 and is optically coupled to optical waveguide 15. Mesas 24 and 26 are spaced apart from mesa 22. Opening 20b is a through hole that penetrates gain section 20 in the Z-axis direction.

The length of mesa 22 in the X-axis direction are, for example, 1 mm. The width of mesa 22 in the Y-axis direction is, for example, 3 µm. The width of each of mesas 24 and 26 may be equal to, greater than, or less than the width of mesa 22. The height of mesas 22, 24, and 26 from the surface of active layer 36 is, for example, 2 µm.

As illustrated in FIG. 1A, mesa 22 extends in the X-axis direction. Both ends of mesa 22 in the X-axis direction have a tapered shape and each width of the tapered shapes become narrower along the direction from gain section 20 toward the end of substrate 10. Gain section 20 has a tapered portion 20a at each of two ends in the X-axis direction. Tapered portion 20a is formed in damage mitigation layer 30 and cladding layer 32, is located on optical waveguide 15, extends in the X-axis direction, and is tapered along the direction from gain section 20 toward the edge of substrate 10.

Damage mitigation layer 30 and optical confinement layers 34 and 37 are formed of, for example, undoped gallium indium arsenide phosphide (i-GaInAsP). The thicknesses of damage mitigation layer 30 is, for example, 200 nm. The thicknesses of optical confinement layers 34 and 37 are, for example, 100 nm. The band gap wavelengths of damage mitigation layer 30 and optical confinement layers 34 and 37 are, for example, 1.2 µm, which is shorter than the wavelength of the light emitted from gain section 20.

Cladding layer 32 is formed of, for example, n-type indium phosphide (n-InP). The thicknesses of cladding layer 32 is, for example, 200 nm. For example, Si can be used as an n-type dopant. The dopant concentration of cladding layer 32 is, for example, $1\times10^{19}$ cm$^{-3}$. Cladding layer 38 is formed of, for example, p-type InP (p-InP). The thickness of cladding layer 38 is, for example, 1500 nm thick. Contact layer 39 is formed of, for example, p+-type gallium indium arsenide ((p+)-GaInAs). For example, zinc (Zn) can be used as a p-type dopant. The dopant concentration of cladding layer 38 is, for example, $1\times10^{18}$ cm$^{-3}$. The dopant concentration of contact layer 39 is, for example, $1\times10^{19}$ cm$^{-3}$.

Active layer 36 has a multi quantum well (MQW) structure, and includes a plurality of well layers and a plurality of barrier layers. The plurality of well layers and the plurality of barrier layers are alternately laminated. One well layer is formed of, for example, GaInAsP having a 6-nm thickness. One barrier layer is formed of, for example, GaInAsP having a 10-nm thickness.

Semiconductor optical device 100 has a recess 50. Recess 50 is located between mesa 24 and mesa 22 and overlaps opening 20b of gain section 20. Recess 50 extends along mesa 22. Recess 50 is sunk from the upper surface of substrate 10 in the Z-axis direction, penetrates Si layer 16 and box layer 14 of substrate 10, and extends to substrate 12. Substrate 12 is a bottom surface of recess 50. Recess 50 has a tapered shape tapering downward in the Z-axis direction. Specifically, the width of recess 50 narrows as it approaches the bottom surface of recess 50. Inner walls 52 and 54 of recess 50 are inclined with respect to an XZ plane. Inner wall 52 is located above inner wall 54. There is a flat portion between inner wall 52 and inner wall 54. The inclination angle of inner wall 52 with respect to the XZ plane is, for example, from 30° to 60°. With a portion between inner wall 52 and inner wall 54 as a reference, inner wall 54 is inclined to a side opposite to inner wall 52 with respect to the XZ plane, and an absolute value of an inclination angle is, for example, from 30° to 60°.

A width W2 of the bottom surface of recess 50 is, for example, 10 μm. A distance L1 from the end of the bottom surface of recess 50 to the end of mesa 22 is, for example, 15 μm.

Insulating films 40 and 42 cover gain section 20 and substrate 10. Insulating film 40 covers the upper surfaces and the side surfaces of mesas 22, 24, and 26, covers the upper surface of active layer 36, and covers the side surfaces of damage mitigation layer 30, cladding layer 32, optical confinement layer 34, and active layer 36. Insulating film 42 covers the surface of insulating film 40, inner walls 52 and 54 of recess 50, and the bottom surface of recess 50. Insulating film 40 is formed of, for example, SiO2 having a thickness of 600 nm. Insulating film 40 is a cladding layer for confining light in optical waveguide 15. Insulating film 42 is formed of SiO$_2$ having a thickness from 10 nm to 50 nm, for example.

Insulating films 40 and 42 have an opening between mesa 22 and mesa 26 and an opening above mesa 22. An electrode 44 is provided between mesa 22 and mesa 26 and contacts an upper surface of cladding layer 32 exposed through the opening of insulating films 40 and 42. Electrode 44 is an n-type electrode and is electrically connected to cladding layer 32. A wiring line 45 contacts an upper surface of electrode 44 and extends to the side surface and the upper surface of mesa 26. Wiring line 45 is an n-type wiring line and is electrically connected to electrode 44.

An electrode 46 is provided on the upper surface of mesa 22 and contacts an upper surface of contact layer 39 exposed through the opening of insulating films 40 and 42. Electrode 46 is a p-type electrode and is electrically connected to contact layer 39. A wiring line 48 contacts the upper surface of electrode 46 and extends to the side surface of mesa 22, the inside of recess 50, and the side surface and the upper surface of mesa 24. Wiring line 48 is a p-type wiring line and is electrically connected to electrode 46. Electrode 44 is formed of, for example, an alloy of gold, germanium, and Ni (AuGeNi). Electrode 46 is formed of, for example, a laminate of titanium, platinum, and gold (Ti/Pt/Au). Wiring lines 45 and 48 are formed of a metal such as gold (Au) having a thickness of 3 μm, for example, and are used for electrical connection with an external device.

Gain section 20 has an optical gain and is evanescently coupled to substrate 10. By applying a voltage to semiconductor optical device 100 using wiring lines 45 and 48, a current flows through mesa 22. By injecting carriers into active layer 36, active layer 36 generates light. The light transits from gain section 20 to substrate 10, propagates through optical waveguide 15, and is emitted to the outside of semiconductor optical device 100. Since tapered portion 20a is provided in gain section 20, reflection of light between gain section 20 and optical waveguide 15 is suppressed, and loss of light is suppressed.

(Method of Manufacturing a Semiconductor Optical Device)

FIG. 2A, FIG. 4A, FIG. 5A, FIG. 6A, FIG. 7A, FIG. 8A, FIG. 9A, FIG. 10A, and FIG. 12A are plan views illustrating the method of manufacturing semiconductor optical device 100. FIG. 2B, FIG. 2C, FIG. 3A, FIG. 3B FIG. 4B, FIG. 5B, FIG. 6B, FIG. 7B, FIG. 7C, FIG. 8B, FIG. 9B, FIG. 10B, FIG. 10C, FIG. 11A, FIG. 11B, and FIG. 12B are cross-sectional views illustrating the method of manufacturing semiconductor optical device 100, and each illustrates a cross-section (A-A cross-section) corresponding to FIG. 1B. An Si wafer (substrate 10) and a compound semiconductor wafer (a substrate 31) are used to manufacture semiconductor optical device 100.

Figure 2A:
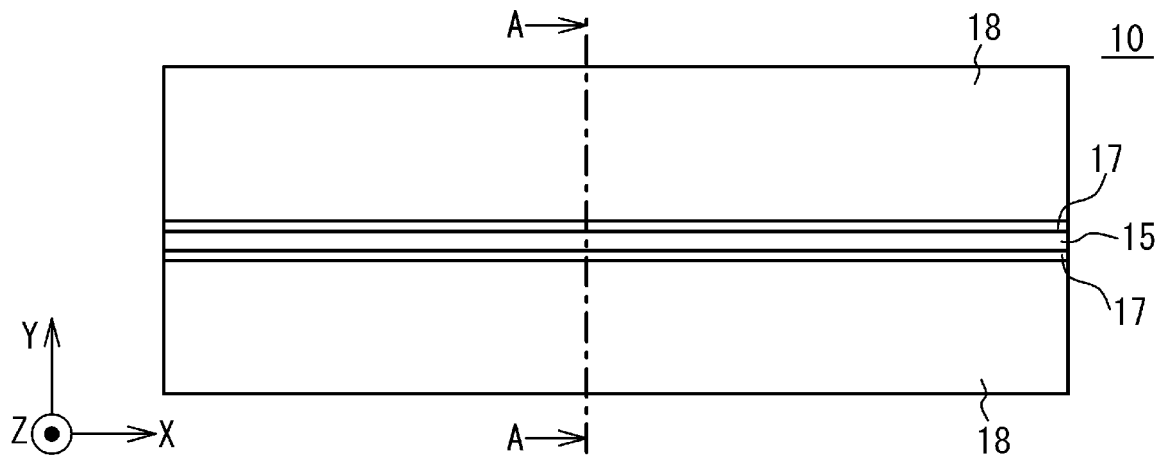
FIG. 2A is a plan view illustrating a method of manufacturing the semiconductor optical device.
Figure 2B:
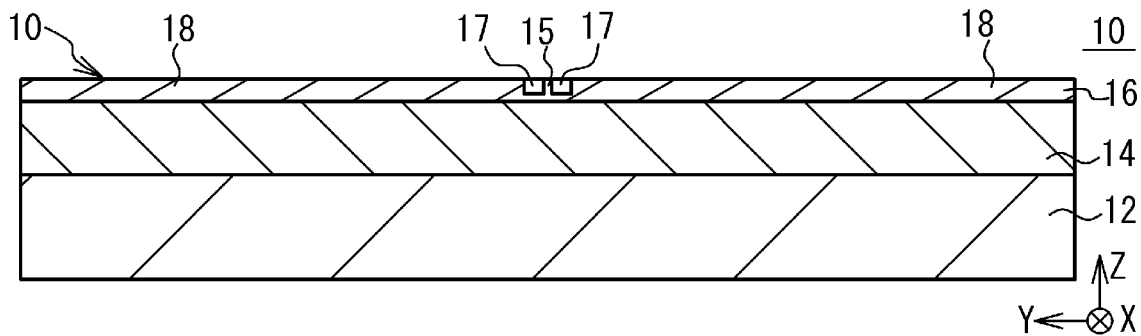
FIG. 2B is a cross-sectional view illustrating a method of manufacturing the semiconductor optical device.

As illustrated in FIGS. 2A and 2B, dry etching is performed on Si layer 16 of substrate 10 to form grooves 17. The portions that are not dry-etched are optical waveguide 15 and terraces 18.

Figure 2C:
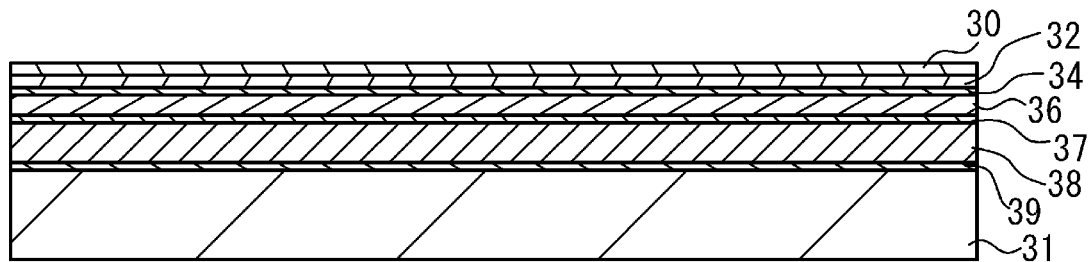
FIG. 2C is a cross-sectional view illustrating a method of manufacturing the semiconductor optical device.

As illustrated in FIG. 2C, contact layer 39, cladding layer 38, optical confinement layer 37, active layer 36, optical confinement layer 34, cladding layer 32, and damage mitigation layer 30 are epitaxially grown in this order on the upper surface of the n+-type InP substrate 31 by, for example, OMVPE (Organometallic Vapor Phase Epitaxy). Gain section 20 is formed by dicing. Mesa 22, 24 and 26, opening 20b, the electrode and the wiring line are not provided in gain section 20 immediately after dicing.

Figure 3A:
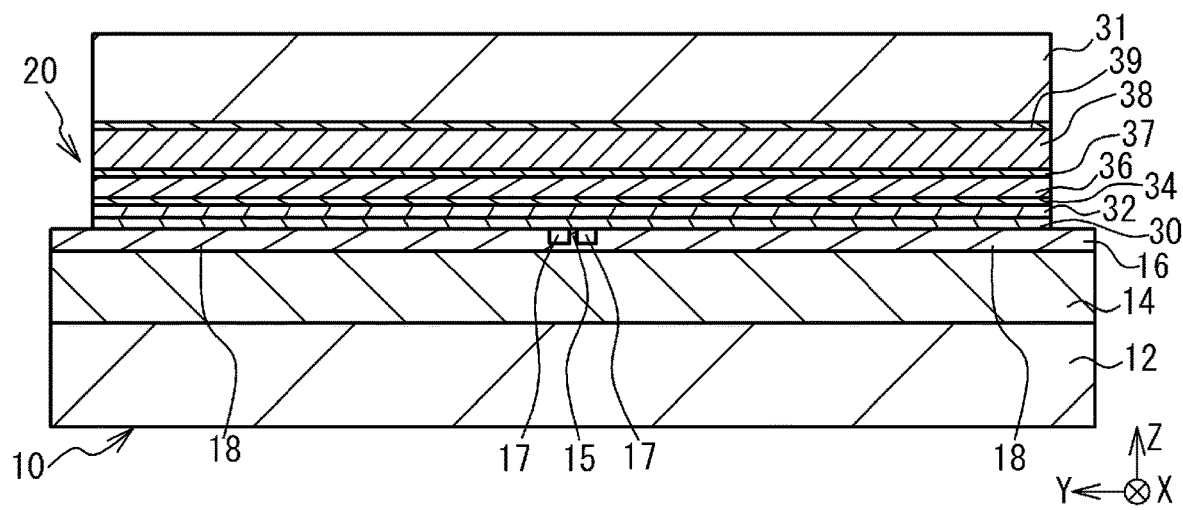
FIG. 3A is a cross-sectional view illustrating a method of manufacturing the semiconductor optical device.

As illustrated in FIG. 3A, gain section 20 is bonded to the upper surface of substrate 10. N$_2$ plasma treatment is performed on a lower surface of gain section 20 (i.e., the surface of damage mitigation layer 30) and the upper surface of substrate 10 (i.e., the surface of the Si layer 16) to activate them. The activated surface is ultrasonically cleaned in water. The surface of damage mitigation layer 30 and the surface of Si layer 16 are brought into contact with each other in air at room temperature to perform temporary bonding (H$_2$ bonding). After the temporary bonding, annealing is performed, for example, at 300° C. for 2 hours to remove moisture and strengthen the bonding strength (02 bonding). Gain section 20 overlies optical waveguide 15.

Figure 3B:
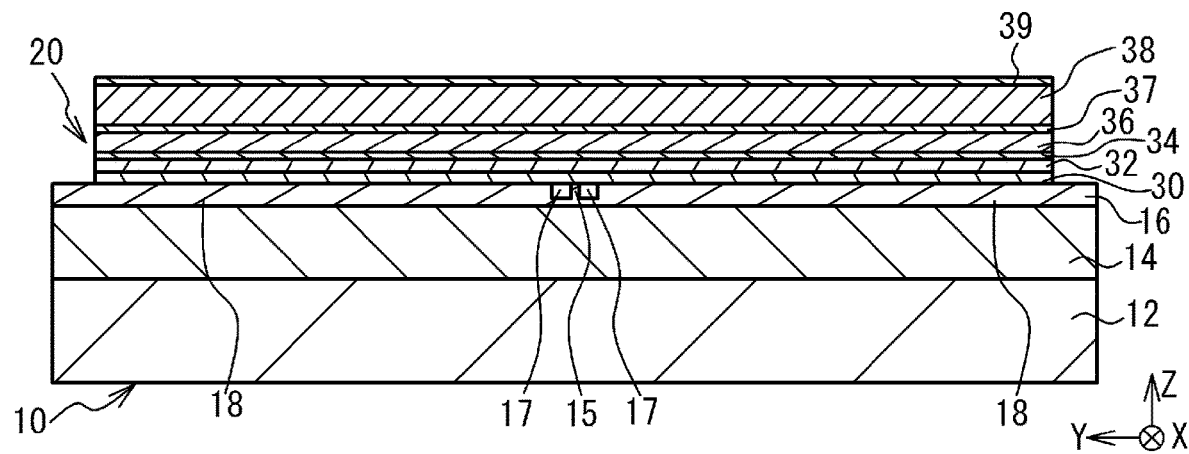
FIG. 3B is a cross-sectional view illustrating a method of manufacturing the semiconductor optical device.

As illustrated in FIG. 3B, wet etching using, for example, hydrochloric acid (HCl) as an etchant is performed to remove substrate 31 of gain section 20. Contact layer 39 functions as an etching stop layer. The semiconductor layers from contact layer 39 to damage mitigation layer 30 remain.

Figure 4A:
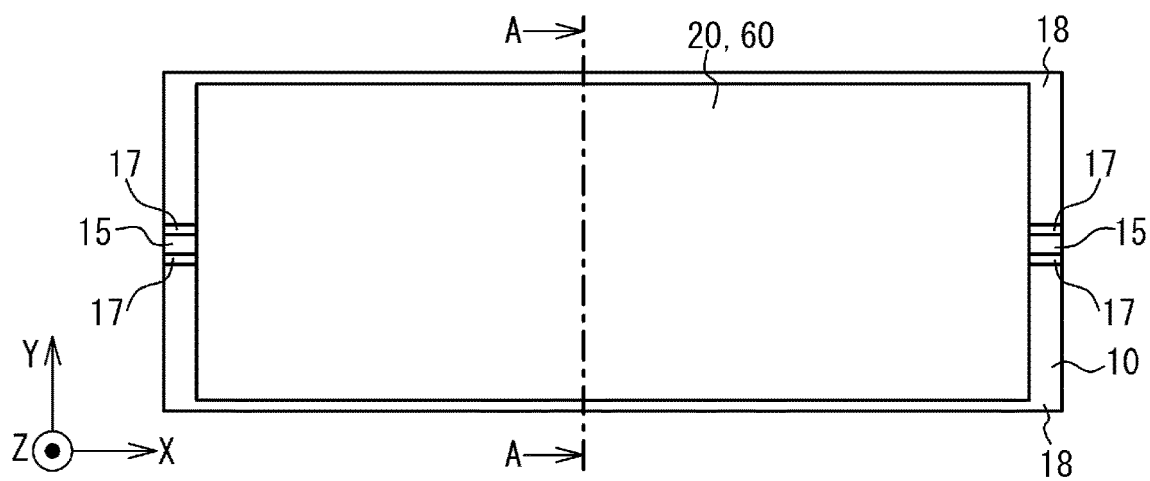
FIG. 4A is a plan view illustrating a method of manufacturing the semiconductor optical device.
Figure 4B:
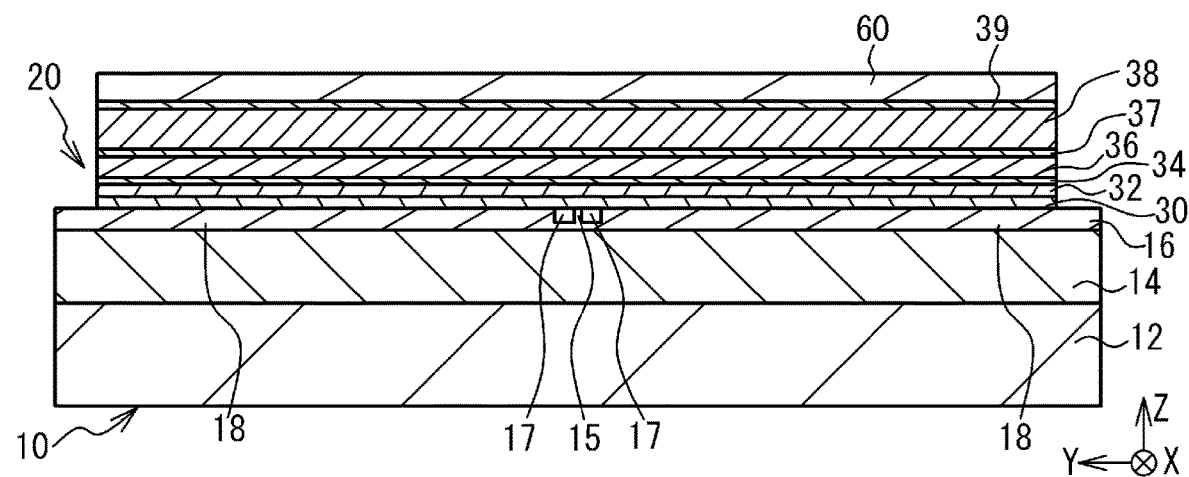
FIG. 4B is a cross-sectional view illustrating a method of manufacturing the semiconductor optical device.

As illustrated in FIGS. 4A and 4B, an insulating film 60 is deposited on the upper surface of contact layer 39 by, for example, chemical vapor deposition (CVD). Insulating film 60 is formed of, for example, silicon nitride (SiN) or SiO$_2$ film having a thickness from 100 nm to 500 nm. A photoresist (not illustrated) is applied on insulating film 60. Photolithography is performed to form a resist pattern. The resist pattern is transferred to insulating film 60 by wet etching using buffered hydrogen fluoride (BHF), reactive ion etching (RIE) using tetrafluoromethane ($CF_4$), or the like. Using insulating film 60 as an etching mask, etching is performed from contact layer 39 to damage mitigation layer 30 by RIE using methane and hydrogen ($CH_4/H_2$), wet etching, or the like, and gain section 20 is formed. The planar shape of gain section 20 is rectangular. Insulating film 60 is removed. In a portion of substrate 10 to which gain section 20 is not bonded, optical waveguide 15 is exposed. An insulating film (not illustrated) is provided on a portion of substrate 10 to which gain section 20 is not bonded. This insulating film is part of insulating film 40 of FIG. 1B.

Figure 5A:
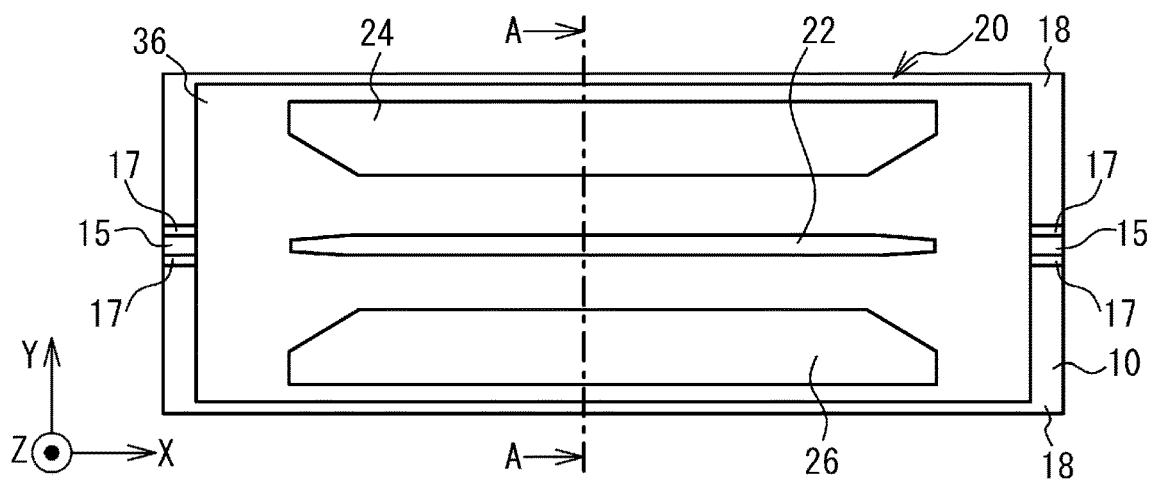
FIG. 5A is a plan view illustrating a method of manufacturing the semiconductor optical device.
Figure 5B:
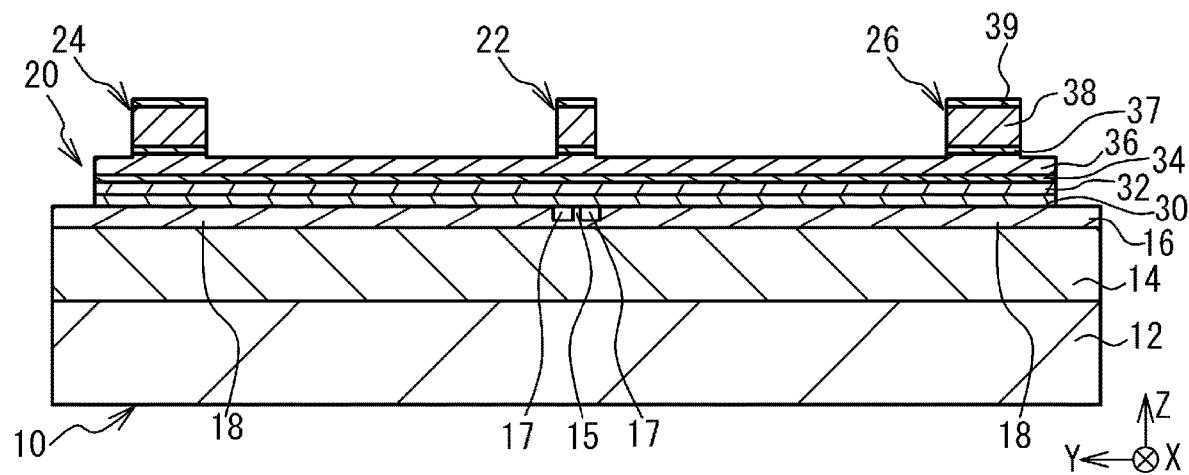
FIG. 5B is a cross-sectional view illustrating a method of manufacturing the semiconductor optical device.

As illustrated in FIGS. 5A and 5B, mesas 22, 24 and 26 are formed in gain section 20. For example, an insulating film (not illustrated) such as SiN or $SiO_2$ having a thickness of 100 nm is formed. A resist pattern (not illustrated) is provided on the insulating film, and the resist pattern is transferred to the insulating film by wet etching, RIE, or the like. The insulating film has a shape corresponding to mesas 22, 24 and 26. Using the insulating film as an etching mask, contact layer 39, cladding layer 38, and optical confinement layer 37 are subjected to RIE using methane and hydrogen ($CH_4/H_2$) and wet etching. Portions of contact layer 39, cladding layer 38, and optical confinement layer 37 exposed from the mask are removed by etching. Mesas 22, 24 and 26 are formed in the masked areas. Active layer 36, optical confinement layer 34, cladding layer 32 and damage mitigation layer 30 are extending outside mesas 22, 24 and 26. The insulating film used as a mask is removed by etching using BHF.

Figure 6A:
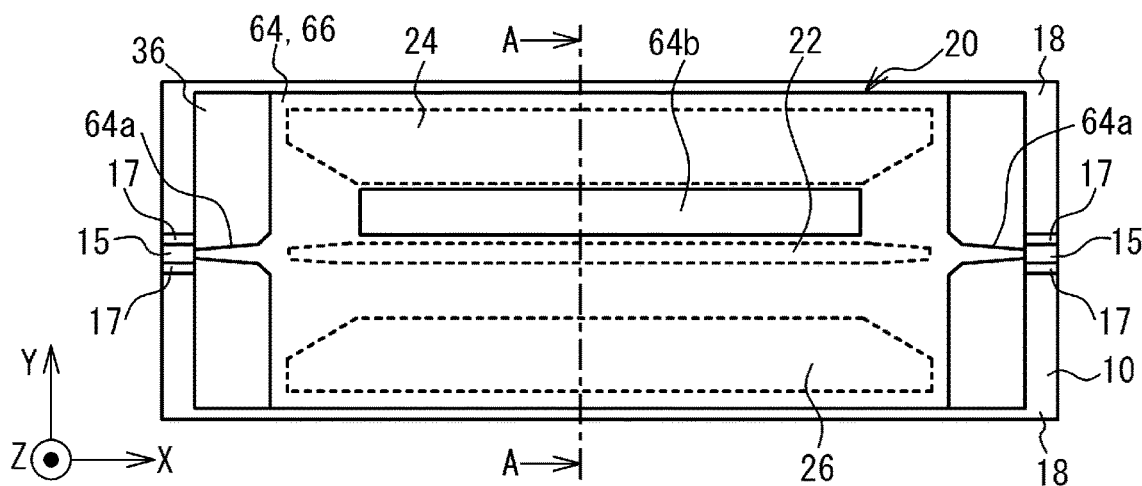
FIG. 6A is a plan view illustrating a method of manufacturing the semiconductor optical device.
Figure 6B:
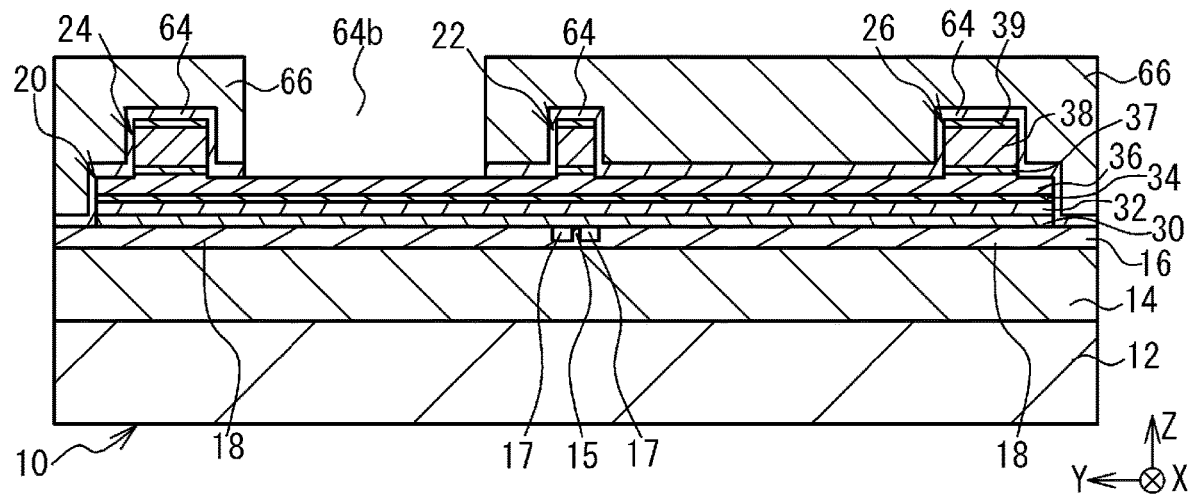
FIG. 6B is a cross-sectional view illustrating a method of manufacturing the semiconductor optical device.

As illustrated in FIGS. 6A and 6B, an insulating film 64 is provided over gain section 20. The photoresist is applied on insulating film 64, and a resist pattern 66 is formed by photolithography. Resist pattern 66 has a tapered portion and an opening. The shape of resist pattern 66 is transferred to insulating film 64 by RIE using $CH_4$. Tapered portions 64a and an opening 64b are formed in insulating film 64. Opening 64b is located between mesa 22 and mesa 24. Each of tapered portions 64a has a tapered shape along the X-axis direction. Resist pattern 66 is removed.

Figure 7A:
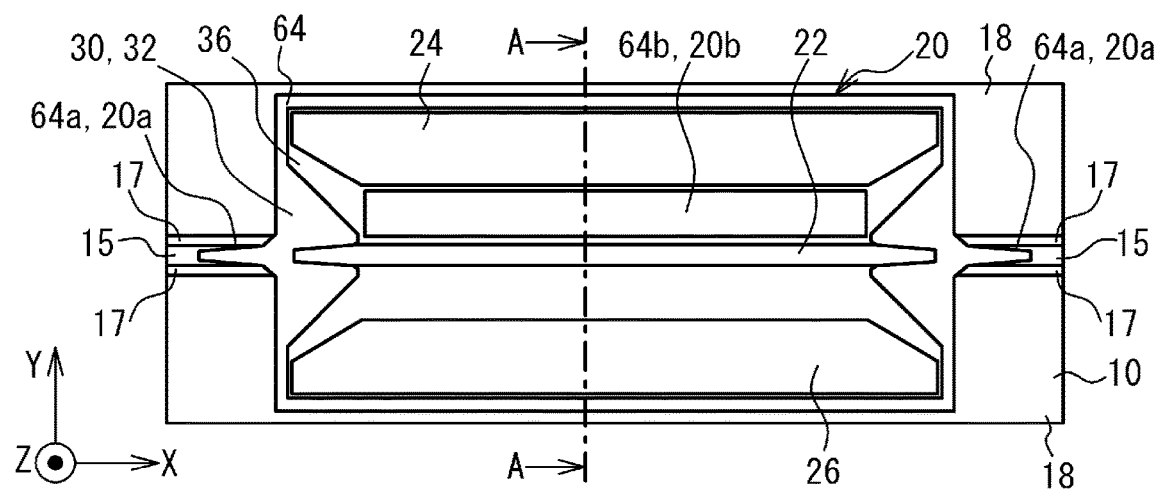
FIG. 7A is a plan view illustrating a method of manufacturing the semiconductor optical device.
Figure 7B:
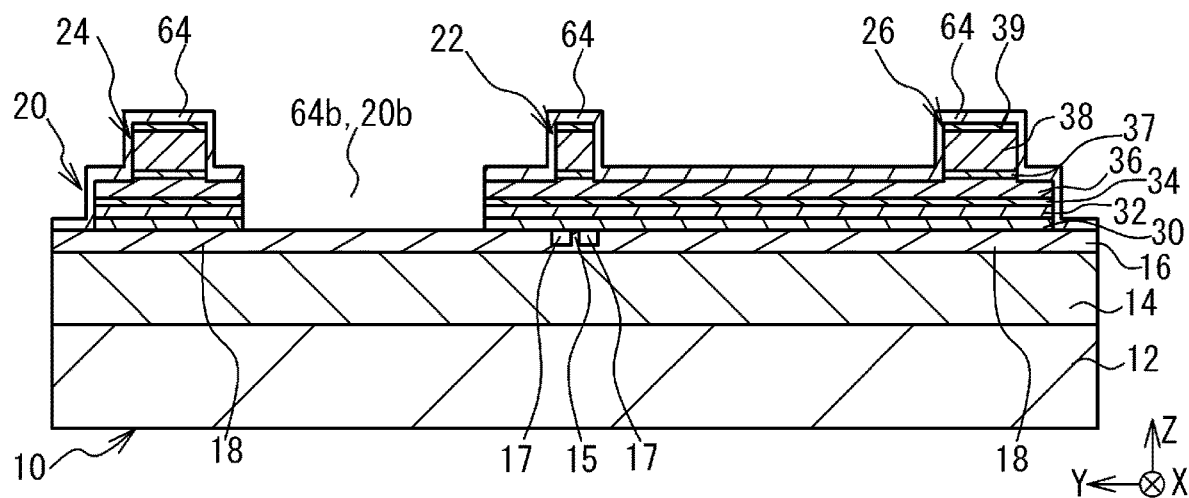
FIG. 7B is a cross-sectional view illustrating a method of manufacturing the semiconductor optical device.

As illustrated in FIGS. 7A and 7B, RIE using $CH_4$ and $H_2$ is performed using insulating film 64 as a mask. Active layer 36, optical confinement layer 34, cladding layer 32, and damage mitigation layer 30 exposed from insulating film 64 are removed. Opening 20b and two tapered portions 20a are formed in gain section 20. Opening 20b is formed at a position overlapping with opening 64b of insulating film 64. Opening 20b is located between mesa 22 and mesa 24 of gain section 20 and extends through active layer 36, optical confinement layer 34, cladding layer 32, and damage mitigation layer 30. Si layer 16 (terrace 18) of substrate 10 is exposed from opening 20b.

After forming tapered portions 20a and opening 20b, insulating film 64 is removed by wet etching using BHF. Portions of active layer 36 and optical confinement layer 34 are removed by etching or the like. As illustrated in FIG. 7A, active layer 36 extends wider than mesas 22, 24 and 26. Damage mitigation layer 30 and cladding layer 32 extend wider than active layer 36 and optical confinement layer 34.

Figure 7C:
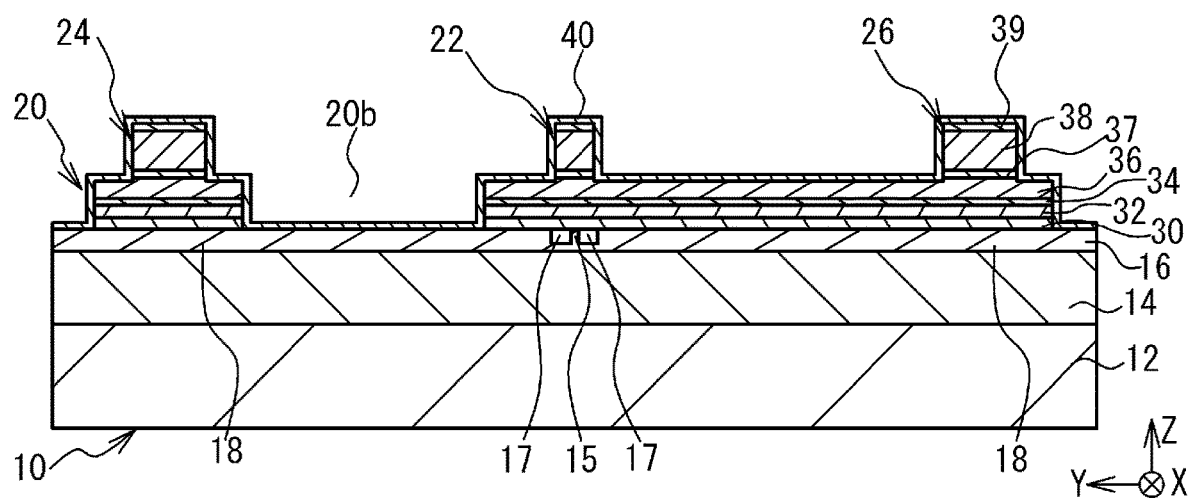
FIG. 7C is a cross-sectional view illustrating a method of manufacturing the semiconductor optical device.

As illustrated in FIG. 7C, insulating film 40 made of $SiO_2$ is formed by, for example, CVD method. Insulating film 40 covers mesas 22, 24, and 26, also covers an inner wall and a bottom surface of opening 20b, and also covers a portion of substrate 10 exposed from gain section 20.

Figure 8A:
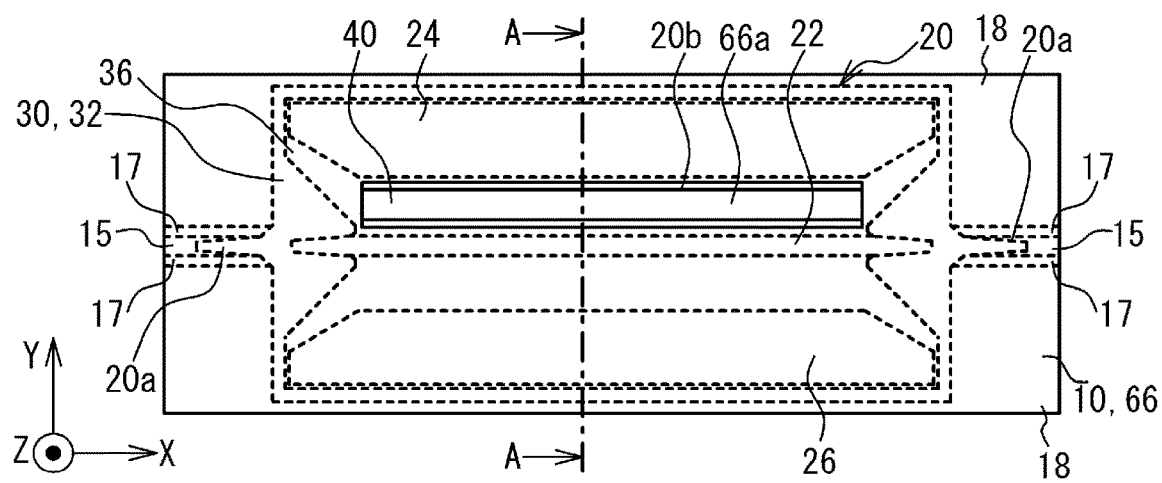
FIG. 8A is a plan view illustrating a method of manufacturing the semiconductor optical device.
Figure 8B:
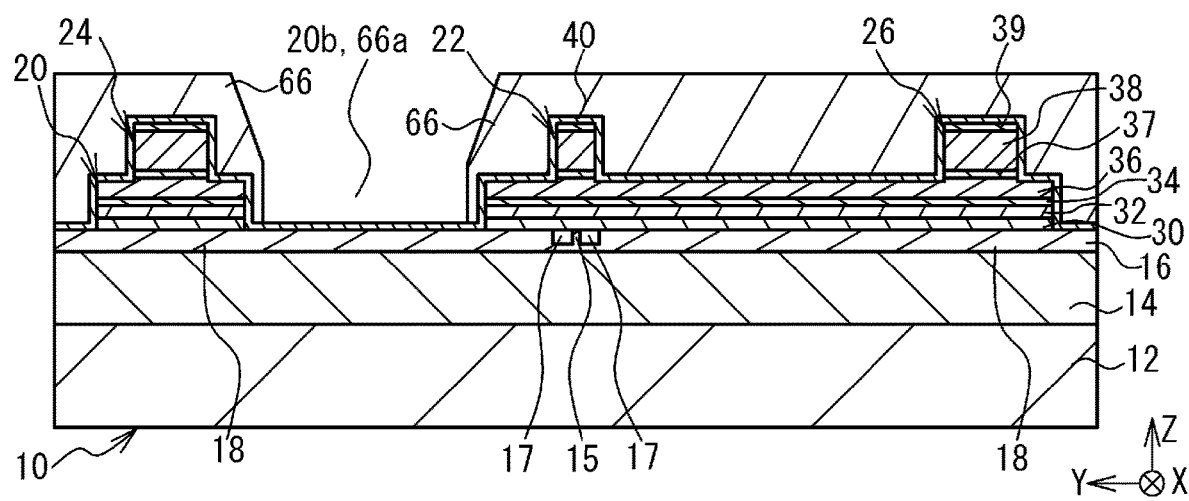
FIG. 8B is a cross-sectional view illustrating a method of manufacturing the semiconductor optical device.

As illustrated in FIGS. 8A and 8B, a photoresist is applied on substrate 10 and gain section 20, and resist pattern 66 is formed by photolithography. Resist pattern 66 has an opening 66a. Opening 66a overlaps opening 20b of gain section 20.

The length of opening 66a in the X-axis direction is equal to the length of opening 20b, for example. The width of opening 66a in the Y-axis direction is smaller than the width of opening 20b. The inner wall of opening 66a is located inside the inner wall of opening 20b. Insulating film 40 is exposed from opening 66a. The inner wall of opening 66a can be inclined with respect to the Z-axis direction as illustrated in FIG. 8B by adjusting the exposure amount, focus, and the like of photolithography. An inclination angle of the inner wall with respect to the Z-axis is from 30° to 60°, for example.

Figure 9A:
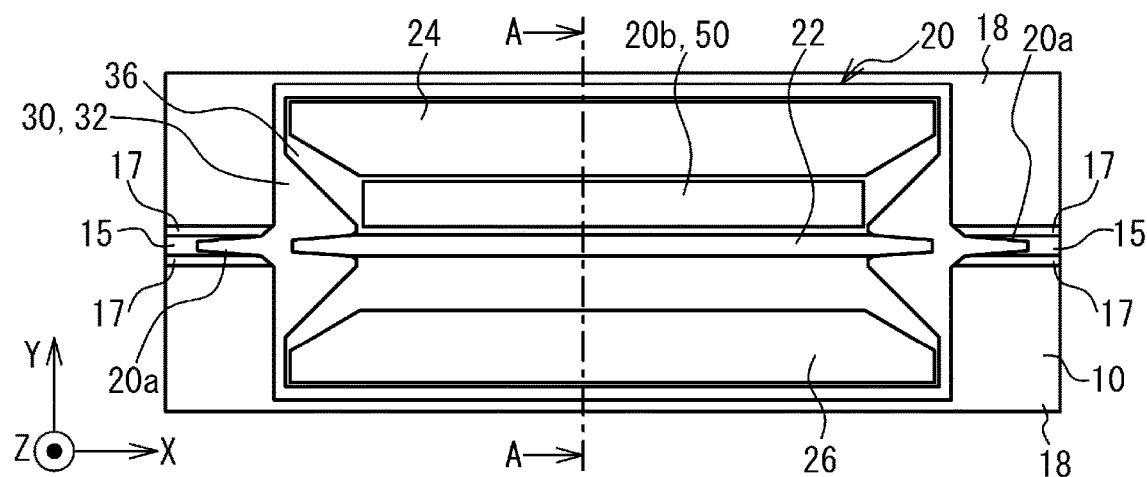
FIG. 9A is a plan view illustrating a method of manufacturing the semiconductor optical device.
Figure 9B:
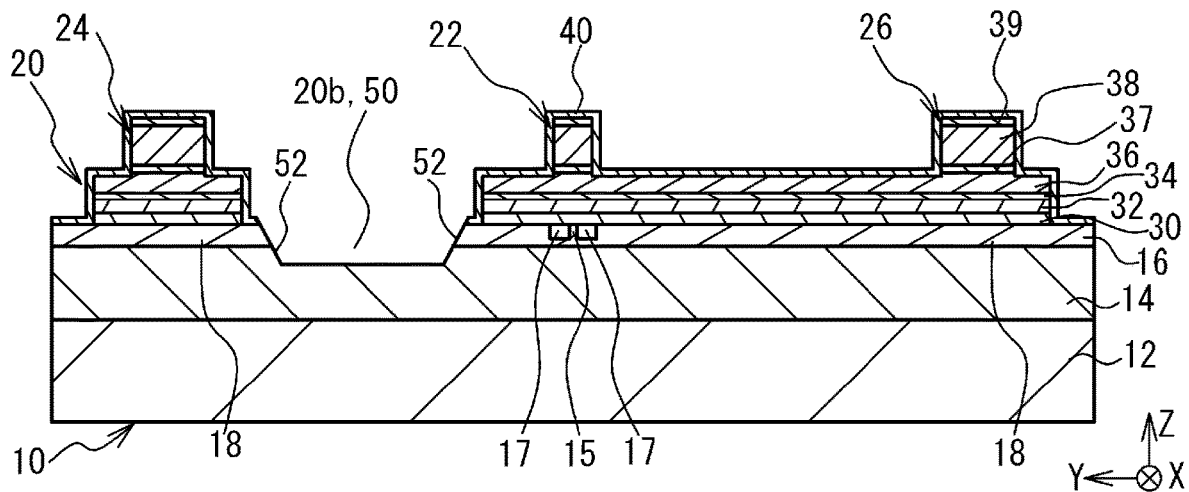
FIG. 9B is a cross-sectional view illustrating a method of manufacturing the semiconductor optical device.

As illustrated in FIGS. 9A and 9B, RIE using $CF_4$ is performed on insulating film 40 and substrate 10 using resist pattern 66 as a mask to form recess 50 in substrate 10. The etching progresses from the upper surface of substrate 10 to a position having a depth of 1 μm or more and 2 μm or less. Recess 50 extends to a certain point of box layer 14 and does not reach substrate 12. The etching selectivity between resist pattern 66 and insulating film 40 may be, for example, 0.8. Depending on the etching selectivity, insulating film 40 and substrate 10 located below the inclined inner wall of resist pattern 66 may be etched. An inclined inner wall 52 is formed corresponding to the inclined inner wall of resist pattern 66. Resist pattern 66 is removed.

Figure 10A:
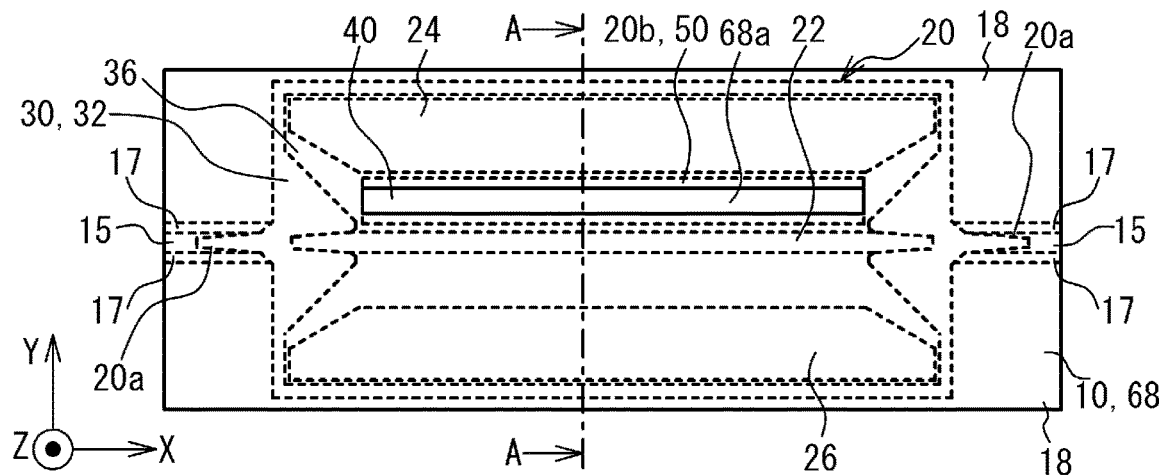
FIG. 10A is a plan view illustrating a method of manufacturing the semiconductor optical device.
Figure 10B:
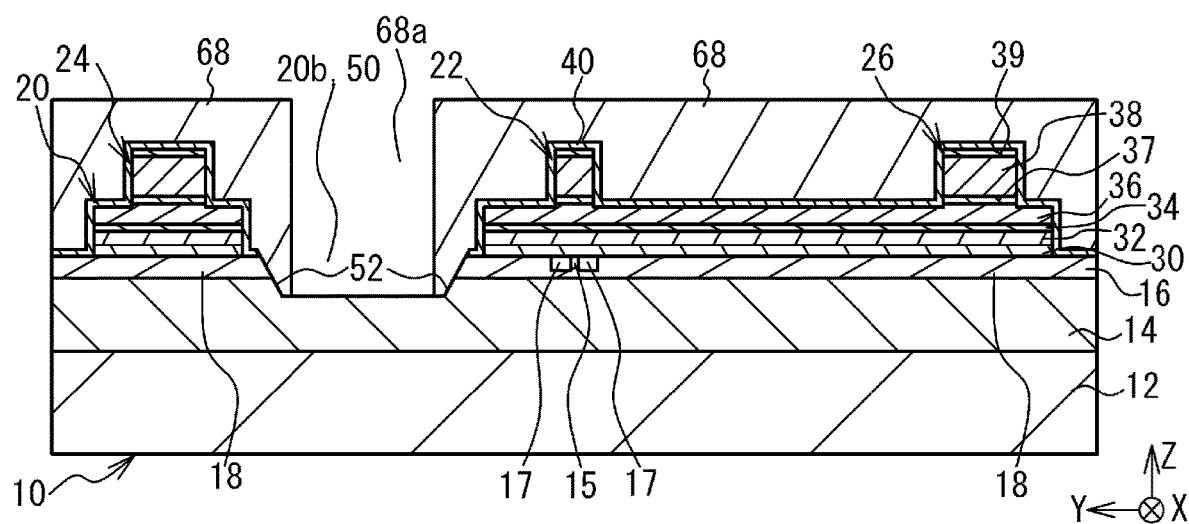
FIG. 10B is a cross-sectional view illustrating a method of manufacturing the semiconductor optical device.

As illustrated in FIGS. 10A and 10B, a resist pattern 68 is formed by photolithography. Resist pattern 68 has an opening 68a at a position overlapping with recess 50. The length of opening 68a in the X-axis direction is equal to the length of recess 50. An inner wall of opening 68a is located inside inner wall 52. Using resist pattern 68 as a mask, wet etching using, for example, BHF is performed to deeply process recess 50.

Figure 10C:
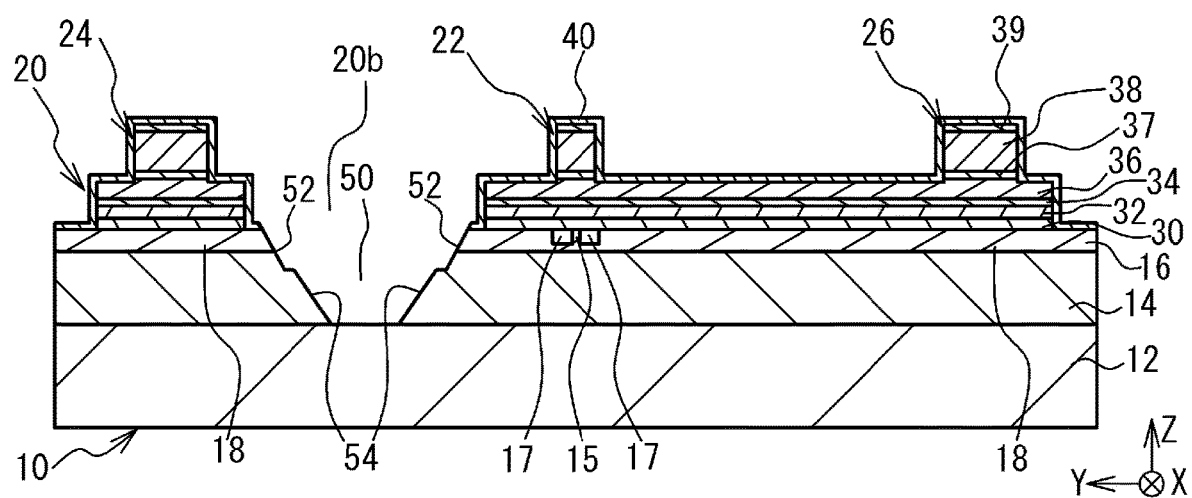
FIG. 10C is a cross-sectional view illustrating a method of manufacturing the semiconductor optical device.

As illustrated in FIG. 10C, a portion of box layer 14 of substrate 10 exposed from opening 68a is removed by wet etching. After wet etching, recess 50 penetrates box layer 14 and extends to substrate 12. An inclined inner wall 54 is formed in box layer 14 by the side etching. After the etching, resist pattern 68 is removed.

Figure 11A:
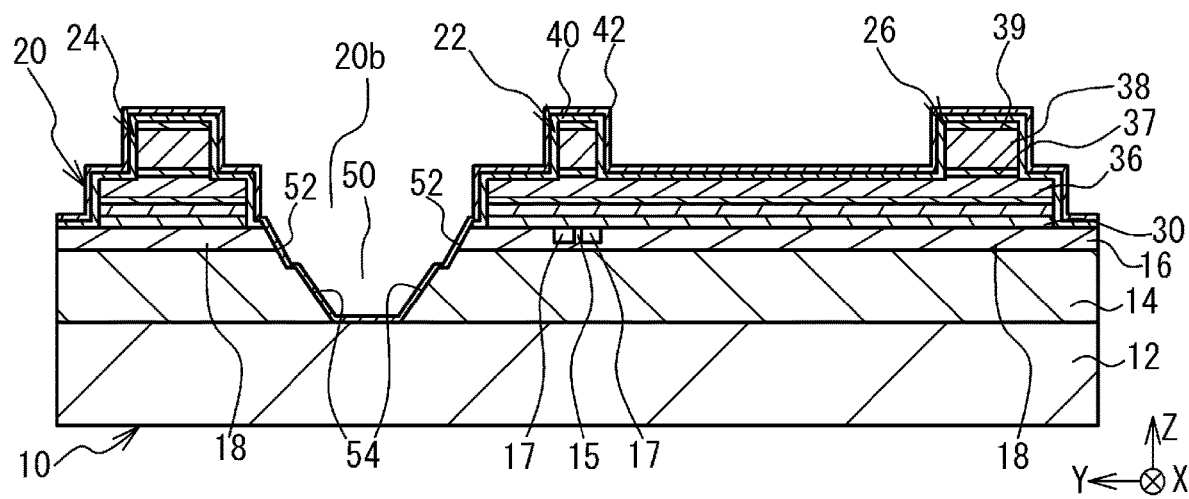
FIG. 11A is a cross-sectional view illustrating a method of manufacturing the semiconductor optical device.

As illustrated in FIG. 11A, insulating film 42 is formed on the surface of insulating film 40 and the inner wall and bottom surface of recess 50 by, for example, atomic layer deposition (ALD).

Figure 11B:
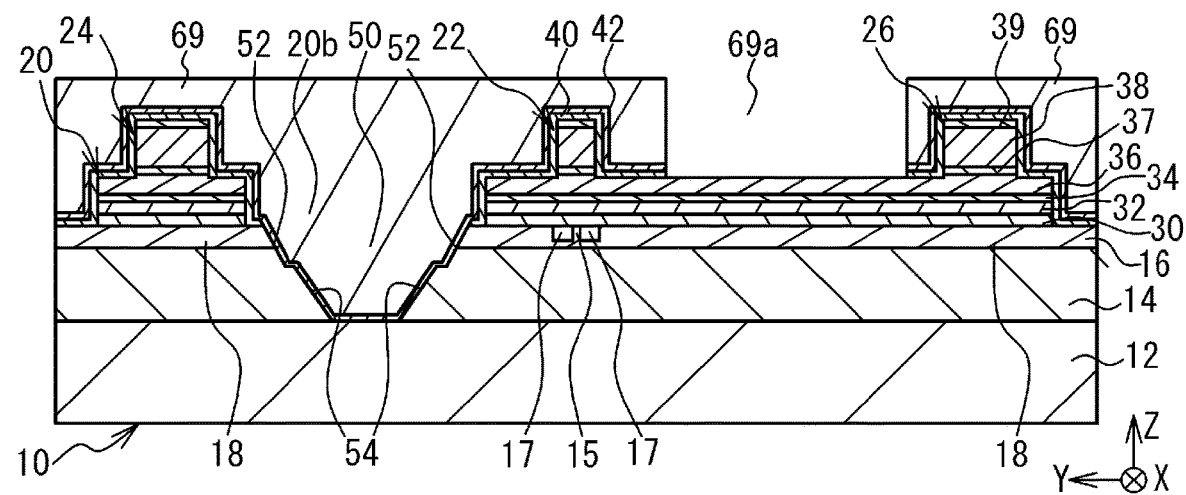
FIG. 11B is a cross-sectional view illustrating a method of manufacturing the semiconductor optical device.

As illustrated in FIG. 11B, a resist pattern 69 is formed on substrate 10 and the upper surface of gain section 20. Resist pattern 69 has an opening 69a between mesa 22 and mesa 26 of gain section 20. Using resist pattern 69 as a mask, wet etching using an etchant containing, for example, sulfuric acid is performed.

Openings are formed in insulating films 40 and 42 at positions overlapping with openings 69a by wet etching. After the wet etching, resist pattern 69 is removed.

Etching is performed using insulating films 40 and 42 as masks to remove portions of active layer 36 and optical confinement layer 34 that are exposed from insulating films 40 and 42. Cladding layer 32 is exposed. Portions of insulating films 40 and 42 on mesa 24 are removed by wet etching or the like using a resist pattern (not illustrated) as a mask.

Figure 12A:
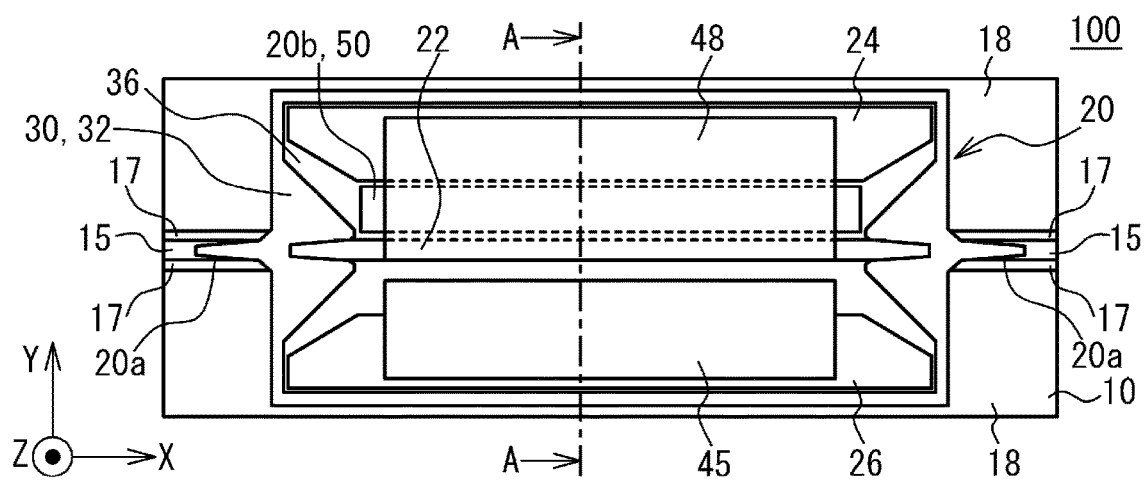
FIG. 12A is a plan view illustrating a method of manufacturing the semiconductor optical device.
Figure 12B:
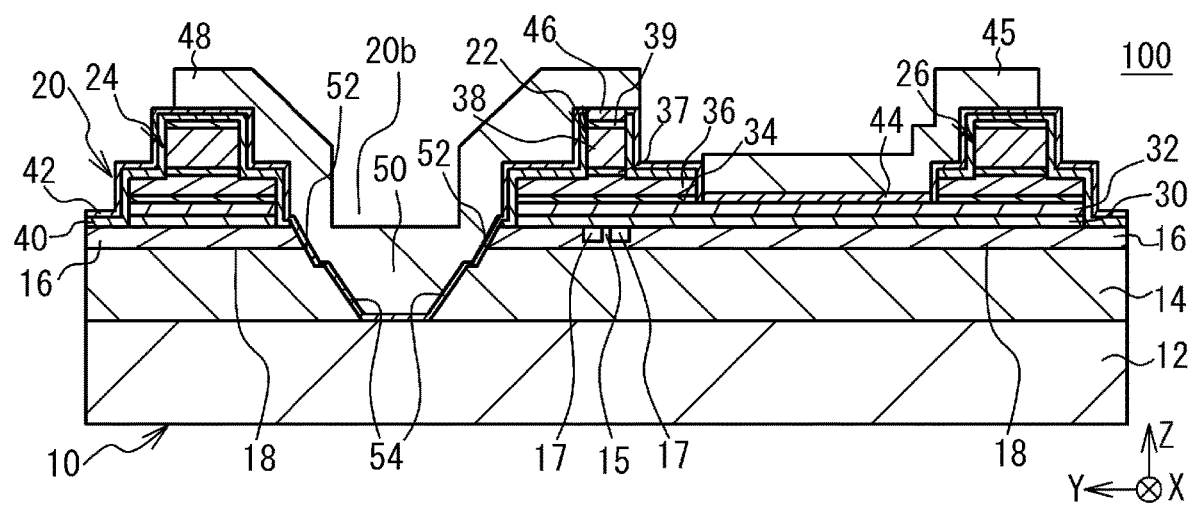
FIG. 12B is a cross-sectional view illustrating a method of manufacturing the semiconductor optical device.

As illustrated in FIGS. 12A and 12B, electrodes 44 and 46 are formed, for example, by vacuum deposition and lift-off. Electrode 44 is located between mesa 24 and mesa 26 and is provided on the upper surface of cladding layer 32. Electrode 46 is located on the upper surface of mesa 24 and is provided on the upper surface of contact layer 39. Wiring lines 45 and 48 are formed by a plating process, for example. Wiring line 45 extends from the upper surface of electrode 44 to the upper surface of mesa 26. Wiring line 48 extends from the upper surface of electrode 46 to the side walls and bottom surface of recess 50 and further to the upper surface of mesa 22. Semiconductor optical device 100 is formed by dicing substrate 10 in a wafer state.

Figure 13:
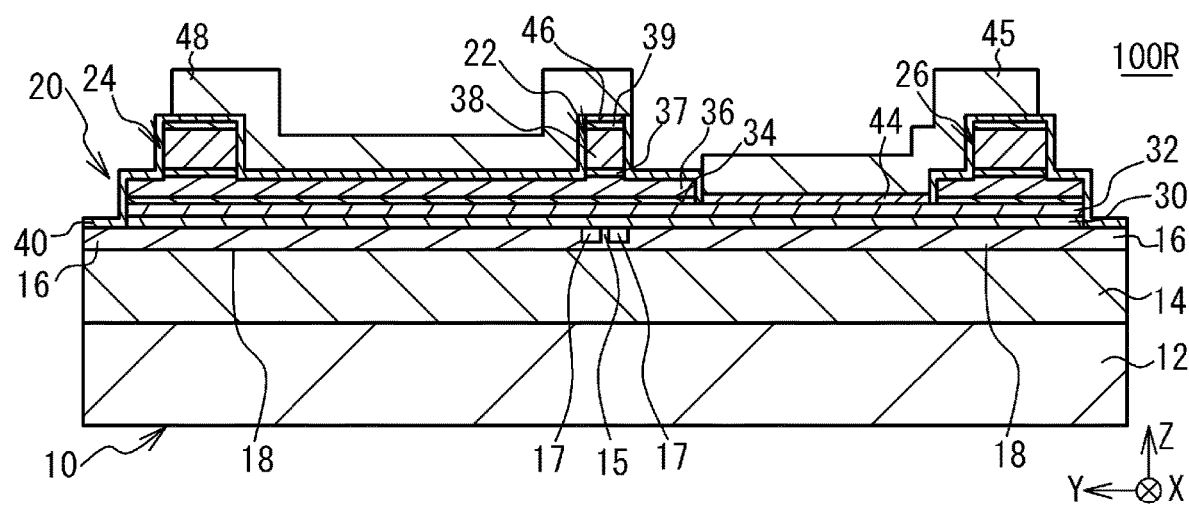
FIG. 13 is a cross-sectional view illustrating a semiconductor optical device according to a comparative example.

FIG. 13 is a cross-sectional view illustrating a semiconductor optical device 100R according to a comparative example. Insulating film 42, opening 20b, and recess 50 are not provided in semiconductor optical device 100R. Wiring line 48 extends over gain section 20.

When carriers are injected and semiconductor optical device 100R is operated, heat is generated in the vicinity of mesa 22. The thermal conductivity of box layer 14 of substrate 10 is lower than those of, for example, Si substrate 12 and Si layer 16. Since box layer 14 serves as a barrier to heat transfer, heat dissipation is inhibited. When the heat dissipation is lowered, the temperature rises and the characteristics are deteriorated. The heat resistance of semiconductor optical device 100R is, for example, 140 K/W. When electric power of 0.3 W is input to semiconductor optical device 100R, the temperature in the vicinity of mesa 22 increases by 40° C. The light output is saturated, making it difficult to increase the output.

According to the first embodiment, recess 50 is provided in substrate 10 at a position spaced apart from mesa 22. Wiring line 48 extends from mesa 22 to the inside of recess 50. Since wiring line 48 extends into recess 50, wiring line 48 and substrate 12 are brought close to each other. Substrate 12 is formed of, for example, Si and has a higher thermal conductivity than box layer 14. Wiring line 48 serves as a path for dissipating heat from mesa 22 to substrate 12. Substrate 12 serves as a path for dissipating heat to the outside of semiconductor optical device 100. Heat generated in mesa 22 is transferred to substrate 12 through the metal wiring line 48, and is dissipated to the outside of semiconductor optical device 100. As a result, the heat dissipation of semiconductor optical device 100 is improved. Temperature rise can be suppressed, and deterioration of characteristics can also be suppressed.

According to the first embodiment, the heat resistance can be, for example, 80K/W. When electric power of 0.3 W is supplied to mesa 22, an increase in temperature around mesa 22 can be suppressed to about 20° C. Saturation or the like of the optical output of semiconductor optical device 100 can be suppressed, and characteristics can be improved. Semiconductor optical device 100 is mounted on, for example, a heat sink (not illustrated). Heat is dissipated from mesa 22 through wiring line 48 and substrate 12 to the heat sink.

Substrate 10 is an SOI substrate and includes Si substrate 12, $SiO_2$ box layer 14, and Si layer 16, which are stacked in sequence. The thermal conductivity of substrate 12 is higher than the thermal conductivity of box layer 14. By providing recess 50 in substrate 10, box layer 14 is less likely to become an obstacle to heat dissipation, and heat is more likely to be transferred to substrate 12. It is possible to enhance heat dissipation and suppress deterioration of characteristics due to temperature rise.

As illustrated in FIG. 1B, recess 50 extends through Si layer 16 and box layer 14 to substrate 12. The bottom surface of recess 50 is Si substrate 12. On the bottom surface of recess 50, box layer 14 is not provided between wiring line 48 and substrate 12. Heat is easily transferred between wiring line 48 and substrate 12, and heat dissipation is further improved.

Insulating film 42 covers the inner wall and bottom surface of recess 50. Wiring line 48 is electrically insulated from Si substrate 12 by insulating film 42. It is possible to suppress a leakage current and suppress a decrease in efficiency. When insulating film 42 is thick, heat is hard to transfer. On the other hand, when insulating film 42 is thin, there is a possibility that a defect occurs in insulating film 42 and a leakage current flows. Insulating film 42 is, for example, from 10 nm to 50 nm. Thereby, heat is dissipated from wiring line 48 to substrate 12, and leakage current can be suppressed.

Inner wall 52 of recess 50 is formed by performing dry etching on substrate 10. Thereafter, wet etching is performed to form inner wall 54. Inner walls 52 and 54 of recess 50 are inclined with respect to the Z-axis direction. Since wiring line 48 is deposited on inclined inner walls 52 and 54 and extends along inner walls 52 and 54, wiring line 48 is hard to break. Current injection and heat dissipation may be effectively performed through wiring line 48. The inclination angle of inner walls 52 and 54 is, for example, 45°, and is in the range of 30° to 60°.

For example, a recess of substrate 10 may be provided outside gain section 20, and wiring line 48 may be extended to the outside of gain section 20. However, by providing a heat dissipation path (wiring line 48 and substrate 12) near mesa 22 which serves as a heat source, heat can be effectively dissipated. According to the first embodiment, opening 20b of gain section 20 overlaps recess 50 of substrate 10. Wiring line 48 extends from mesa 22 to opening 20b and recess 50. Wiring line 48 extending to opening 20b and recess 50 provides a path of heat. Thereby, heat generated in mesa 22 is dissipated in the vicinity of mesa 22. The temperature rise can be suppressed more effectively, and the deterioration of the special case can be suppressed.

Gain section 20 includes mesa 22, 24 and 26. Mesas 24 and 26 are spaced from mesa 22. Recess 50 and opening 20b are preferably provided between mesa 22 and mesa 24. By forming a heat dissipation path in the vicinity of mesa 22, heat can be effectively dissipated. The distance L1 between recess 50 and mesa 22 illustrated in FIG. 1B is preferably within 20 for example. The thicker the wiring line 48, the higher the thermal conductivity of wiring line 48. The thickness of wiring line 48 is, for example, 3 and is preferably 1 μm or more. Wiring line 48 is provided along the bottom surface of recess 50 and inclined inner walls 52 and 54 of recess 50 by, for example, plating. Wiring line 48 can be deposited thickly. When wiring line 48 is formed of a metal such as Au, the thermal conductivity is increased.

The upper surfaces of mesas 22, 24, and 26 lie in the same plane. A collet or the like may come into contact with mesas 22, 24, and 26 in the dicing process, in handling of semiconductor optical device 100, and the like. The yield can be improved by reducing the concentration of stress on one mesa and suppressing breakage. In particular, by arranging mesas 24 and 26 symmetrically with respect to mesa 22, the stress can be evenly distributed.

Gain section 20 includes damage mitigation layer 30, cladding layer 32, optical confinement layer 34, active layer 36, optical confinement layer 37, cladding layer 38, and contact layer 39 that are stacked in sequence from the upper surface of substrate 10. Damage mitigation layer 30, cladding layer 32, optical confinement layer 34, and active layer 36 extend under the three mesas and outside the three mesas.

Current flows through mesa 22 through n-type cladding layer 32 and p-type cladding layer 38. By injecting carriers into active layer 36 under mesa 22, laser light is emitted from semiconductor optical device 100. Heat generated in the vicinity of mesa 22 is dissipated through wiring line 48 and substrate 12. The temperature rise accompanying the operation of semiconductor optical device 100 can be suppressed, and the deterioration of characteristics can be suppressed.

Substrate 10 may be provided with, for example, an optical element such as a ring resonator and a diffraction grating, and a heater. The wavelength of the light emitted from gain section 20 can be controlled.

Second Embodiment

Figure 14:
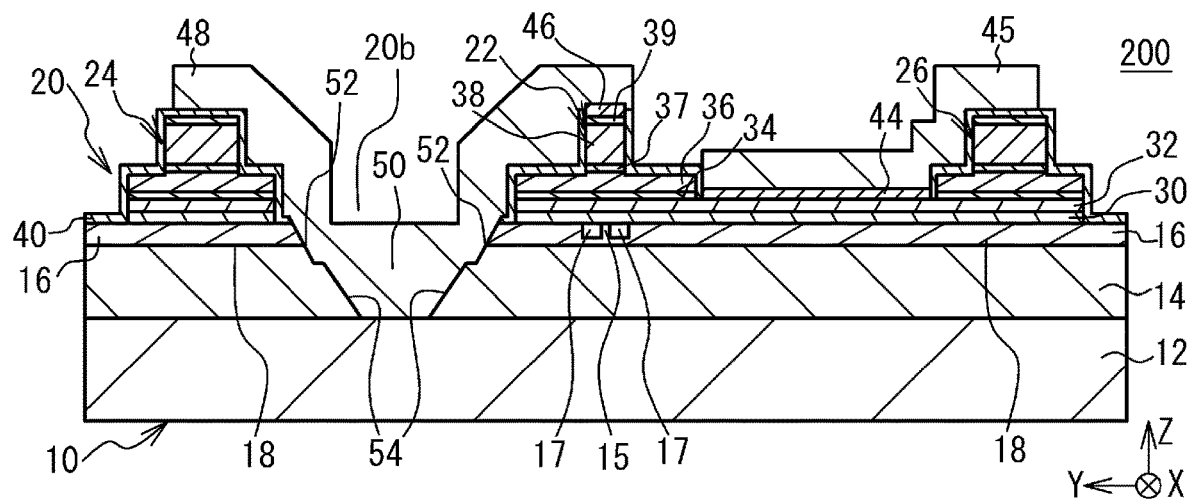
FIG. 14 is a cross-sectional view illustrating a semiconductor optical device according to a second embodiment.

FIG. 14 is a cross-sectional view illustrating a semiconductor optical device 200 according to a second embodiment, and illustrates a cross-section corresponding to FIG. 1B. Description of the same configuration as that of the first embodiment will be omitted.

As illustrated in FIG. 14, recess 50 extends through box layer 14 of substrate 10 to substrate 12. Insulating film 42 is not provided. Wiring line 48 is in contact with inner walls 52 and 54 of recess 50 and the bottom surface of recess 50 (the surface of substrate 12).

In the manufacturing process of semiconductor optical device 200, the steps from FIG. 2A to FIG. 10C are performed to form recess 50. Electrodes 44 and 46 and wiring lines 45 and 48 are formed without forming insulating film 42.

According to the second embodiment, wiring line 48 extends from mesa 22 into recess 50 and is in contact with the surface of substrate 12 inside of recess 50. Heat generated in mesa 22 is transmitted through wiring line 48, and is dissipated from wiring line 48 to substrate 12. Since wiring line 48 is in contact with substrate 12, the heat dissipation is further enhanced, and the temperature rise can be effectively suppressed.

Substrate 12 is formed of Si and has a higher thermal conductivity than box layer 14. Since wiring line 48 is in contact with substrate 12, heat is easily dissipated. On the other hand, substrate 12 has higher electrical conductivity than box layer 14. A leakage current may flow from wiring line 48 to substrate 12. In order to suppress the leakage current, it is preferable to increase the electric resistance of substrate 12. The electric resistivity of substrate 12 is, for example, 1 kΩ·cm or more.

Third Embodiment

Figure 15:
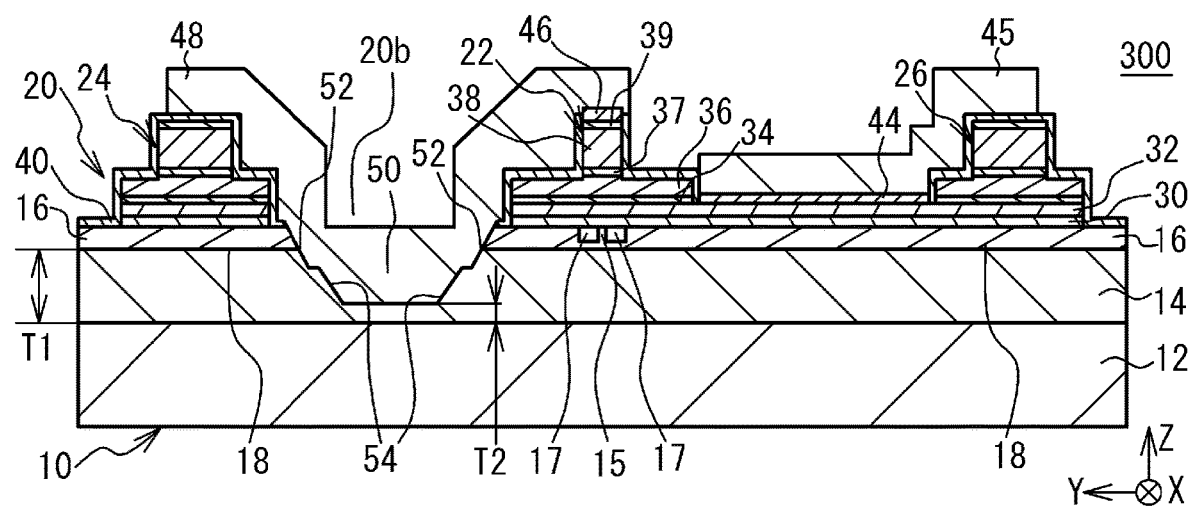
FIG. 15 is a cross-sectional view illustrating a semiconductor optical device according to a third embodiment.

FIG. 15 is a cross-sectional view illustrating a semiconductor optical device 300 according to a third embodiment, and illustrates a cross-section corresponding to FIG. 1B. Description of the same configuration as that of the first embodiment will be omitted.

As illustrated in FIG. 15, recess 50 penetrates Si layer 16 and extends into a certain point of box layer 14. Recess 50 does not penetrate box layer 14 and does not extend to substrate 12. The thickness T1 of box layer 14 in the portion other than recess 50 is 3 μm, for example. A thickness T2 from the upper surface of substrate 12 to the bottom surface of recess 50 (the surface of box layer 14) is smaller than the thickness T1, and is, for example, from 100 nm to 200 nm. Insulating film 42 is not provided.

In the manufacturing process of semiconductor optical device 200, steps from FIG. 2A to FIG. 10B are performed. In a step corresponding to FIG. 10C, etching is stopped in the certain point of box layer 14. Electrodes 44 and 46 and wiring lines 45 and 48 are formed without forming insulating film 42.

According to the third embodiment, wiring line 48 extends from mesa 22 to recess 50. Box layer 14 thinner than the portion other than recess 50 remains inside of recess 50. Since box layer 14 is thin, heat is easily transferred in recess 50. Heat generated in mesa 22 is transmitted through wiring line 48, and is dissipated from wiring line 48 to substrate 12. An increase in temperature can be suppressed by an increase in heat dissipation.

The thinner box layer 14 at the bottom of recess 50, the higher the heat dissipation. The thickness T2 of box layers 14 are preferably, for example, ⅕ or less, or ¹/₁₀ or less of the thickness T1.

Although the embodiments of the present disclosure have been described in detail, the present disclosure is not limited to the specific embodiments, and various modifications and changes can be made within the scope of the present disclosure described in the claims.

What is claimed is:

1. A semiconductor optical device comprising:
   a substrate including an optical waveguide;
   a gain section formed of a compound semiconductor, having an optical gain, bonded to an upper surface of the substrate, and including a first mesa; and
   a first wiring line electrically connected to the gain section,
   wherein the first mesa of the gain section is optically coupled to the optical waveguide,
   the substrate includes a first layer, a second layer, and a third layer,
   a thermal conductivity of the first layer is higher than a thermal conductivity of the second layer,
   the second layer is stacked on the first layer,
   the third layer is stacked on the second layer and includes the optical waveguide,
   a recess is provided in the substrate at a position spaced from the first mesa, the recess being sunk from the upper surface of the substrate in a thickness direction of the substrate,
   the recess extends through the third layer to the second layer in the thickness direction, and
   the first wiring line extends from the first mesa of the gain section to the recess.

2. The semiconductor optical device according to claim 1, wherein the first layer and the third layer are formed of silicon, and
   the second layer is formed of silicon oxide.

3. The semiconductor optical device according to claim 1, wherein the recess extends through the third layer and the second layer,
   the recess has an insulating film covering a bottom surface of the recess, and
   the first wiring line is provided on a surface of the insulating film.

4. The semiconductor optical device according to claim 1, wherein the recess extends through the third layer and the second layer, and
   the first wiring line is in contact with the first layer inside the recess.

5. The semiconductor optical device according to claim 1, wherein the recess extends to a certain point of the second layer in the thickness direction.

6. The semiconductor optical device according to claim 1, wherein an inner wall of the recess is inclined with respect to the thickness direction.

7. The semiconductor optical device according to claim 1, wherein the gain section has an opening at a position overlapping with the recess, and the first wiring line extends from the first mesa to the opening and the recess.

8. The semiconductor optical device according to claim 1, wherein the gain section includes a second mesa,
- the second mesa is spaced from the first mesa,
- the gain section has an opening at a position overlapping with the recess and between the second mesa and the first mesa, and
- the first wiring line extends from the first mesa to the opening and the recess.

9. The semiconductor optical device according to claim 1, wherein the gain section includes a first semiconductor layer, an active layer, and a second semiconductor layer stacked in sequence on the upper surface of the substrate,
- the first mesa includes the second semiconductor layer,
- the first semiconductor layer has a first conductivity-type and extends below and outside the first mesa in a direction in which the upper surface of the substrate extends,
- the second semiconductor layer has a second conductivity-type different from the first conductivity-type,
- the active layer is located below the first mesa,
- the first wiring line is electrically connected to the second semiconductor layer, and
- the semiconductor optical device includes a second wiring line electrically connected to the first semiconductor layer.

\* \* \* \* \*